US005128727A

United States Patent [19]

Miyauchi et al.

[11] Patent Number: 5,128,727

[45] Date of Patent: Jul. 7, 1992

[54] COPYING APPARATUS HAVING DETECTORS FOR DETECTING THE PRESENCE OF AN ORIGINAL AND TRANSFER PAPER

[75] Inventors: Yasuo Miyauchi; Akihiro Nomura, both of Yokohama, Japan

[73] Assignee: Canon Kabushiki Kaisha, Tokyo, Japan

[21] Appl. No.: 671,145

[22] Filed: Mar. 18, 1991

Related U.S. Application Data

[63] Continuation of Ser. No. 356,188, May 24, 1989, abandoned.

[30] Foreign Application Priority Data

May 25, 1988 [JP] Japan ............................... 63-127573

[51] Int. Cl.$^5$ ......................... G03B 21/00; B65H 7/02

[52] U.S. Cl. .................................... 355/308; 271/259; 271/265

[58] Field of Search ............... 355/233, 243, 308, 309, 355/311, 317; 271/3.1, 259, 265

[56] References Cited

U.S. PATENT DOCUMENTS 3,948,586 4/1976 Komori et al. ...................... 355/206
4,217,052 8/1980 Tani et al. ....................... 355/243 X
4,257,700 3/1981 Tsuda et al. .................... 355/271 X
4,372,676 2/1983 Miyata et al. .................. 355/311 X
4,417,806 11/1983 Tani et al. ........................ 355/243 X
4,597,660 7/1986 Leng et al. ........................... 355/317
4,839,695 6/1989 Yamamoto et al. ............ 355/317 X
4,855,785 8/1989 Okamoto ........................ 355/233 X

*Primary Examiner*—Fred L. Braun
*Attorney, Agent, or Firm*—Fitzpatrick, Cella, Harper & Scinto

[57] ABSTRACT

There is provided an image forming apparatus such as a copying apparatus having a sensor to detect the front edge of an original and a sensor to detect the front edge of a paper onto which a copy image of the original is formed, in which the copying operation is started in accordance with the result of the detections by both sensors. A distance which is obtained by adding a distance from an exposing position of a photosensitive drum and a distance from an original feed roller to an exposing position is equalized to a distance from the copy transfer position of the photosensitive drum to a paper feed roller. If such distances differ, the feeding timing of the original or paper is delayed in accordance with the difference between those distances. Thus, the cheap and small copying apparatus can be realized without using an expensive control system such as a registration roller.

10 Claims, 3 Drawing Sheets

COPYING APPARATUS HAVING DETECTORS FOR DETECTING THE PRESENCE OF AN ORIGINAL AND TRANSFER PAPER

This application is a continuation of application Ser. No. 356,188 filed May 24, 1989, now abandoned.

BACKGROUND OF THE INVENTION

1. Field of the Invention

The present invention relates to a copying apparatus.

2. Related Background Art

Hitherto, in small copying apparatuses, there is an apparatus in which the copying operation is started by a start key or an apparatus in which the copying operation is started by the detection of a paper in the case where the paper is manually inserted by hand In such apparatuses, a registration roller or a registration shutter to make the front edge of an original coincide with the front edge of a copy transfer paper is provided When the copying apparatus is started by the above method, the original or the original placing base plate is first fed and the copy transfer paper is again conveyed in accordance with the timing for such a feeding operation In such a copying apparatus, the presence or absence of the copy transfer paper is previously detected and if the paper does not exist, the copying operation is inhibited until the papers are supplemented. When the papers are supplemented, the copying operation is started by the start key. Therefore, time and work are necessary to start the copying operation. On the other hand, in the case of the paper hand inserting mode, the copying operation is started when the paper insertion is detected irrespective of the presence or absence of an original. Thus, there is fear that such a copying operation will have been executed in vain.

On the other hand, to construct the registration roller, a relatively expensive control system having a clutch, plunger, and the like is needed. Therefore, in a small copying apparatus, such a control system results in an increase in cost.

SUMMARY OF THE INVENTION

It is an object of the present invention to provide a small copying apparatus in which the operation is simplified.

Another object of the invention is to provide a small copying apparatus in which a registration structure is simplified.

Still another object of the invention is to provide a copying apparatus which can smoothly start the copying operation.

Further another object of the invention is to provide a copying apparatus in which means for detecting the front edges of an original and a copy transfer paper are provided and the presence or absence of the original and paper is checked, the copying operation is started on the basis of the AND condition of two detection signals of the detecting means indicative of the presence of the original and paper, and even when the original and copy transfer paper are set from any direction, the copying operation can be started, and if either the original or the copy transfer paper is set, the copying operation cannot be started.

Further, another object of the invention is to provide a copying apparatus in which sensing levers to detect the front edges of an original and a paper are arranged near a feed roller, thereby providing the function of a registration roller for the paper feed roller and remarkably simplifying the construction.

DETAILED DESCRIPTION OF THE PREFERRED EMBODIMENTS

Figure 1:
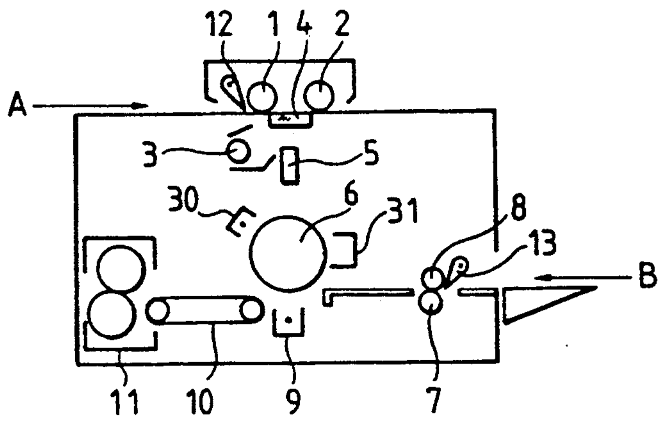
FIG. 1 is a cross sectional view of an embodiment of a copying apparatus according to the present invention.

An explanation will now be made hereinbelow with respect to an example of a copying apparatus in which a copy transfer paper and an original are manually fed by the hand in a sheet through manner. FIG. 1 shows an embodiment of the present invention. The original is fed by feed rollers 1 and 2 in the direction of an arrow A. The original is then illuminated by a light source 3 such as a fluorescent lamp or the like and its image is projected onto a photo sensitive drum 6 through a contact glass 4 and a lens 5. Since the drum 6 has previously been charged by a primary charger 30, an electrostatic latent image is formed by the projection light.

On the other hand, the copy transfer paper is fed in the direction of an arrow B by paper feed rollers 7 and 8. A toner image formed on the drum 6 by a developing device 31 is transferred onto the copy transfer paper by a copy transfer charging device 9. Thereafter, the paper is conveyed to a fixing device 11 by a conveying member 10 and the toner image is fixed. In this manner, the copying operation is finished An original sensing lever 12 and a paper feed sensing lever 13 are provided in the copying apparatus. The levers 12 and 13 are coupled with sensors such as photodiodes or the like and can detect the presence or absence of the original and copy transfer paper. Further, when both of those sensors are turned on the recording operation of the copying apparatus is started. Therefore, any of the original and the paper can be first set. On the other hand, it is possible to prevent a miscopying operation, for example, when the copy transfer paper is fed and the original does not exist.

Figure 5:
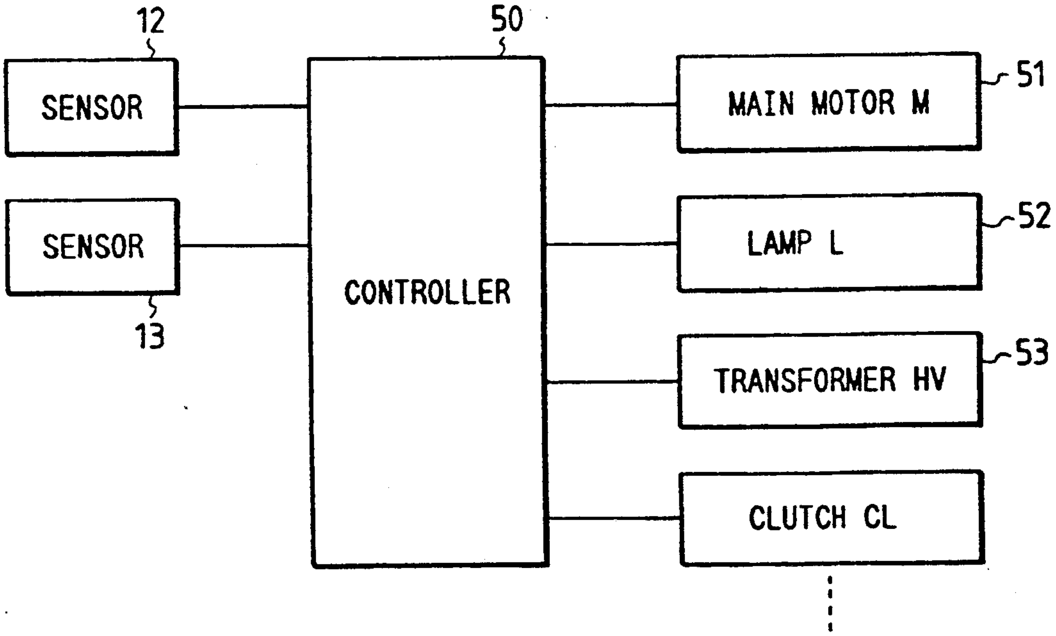
FIG. 5 is a control block diagram of the copying apparatus.

FIG. 5 is a control block diagram of the above copying apparatus. Reference numeral 51 denotes a main motor to rotate the drum 6, fixing roller, and the like. The main motor drives the rollers 1, 2, 7 and 8 through clutches. Reference numeral 52 denotes a driver to drive the lamp 3; 53 indicates a transformer to apply high voltages to the primary charger and the copy transfer charging device; 12 and 13 denote the sensors shown in FIG. 1; and 50 denotes a controller such as a microcomputer for receiving signals from the sensors and supplying control signals to the above various kinds of drivers The controller 50 has a memory in which a program as shown in FIG. 6 is stored.

Figure 6:
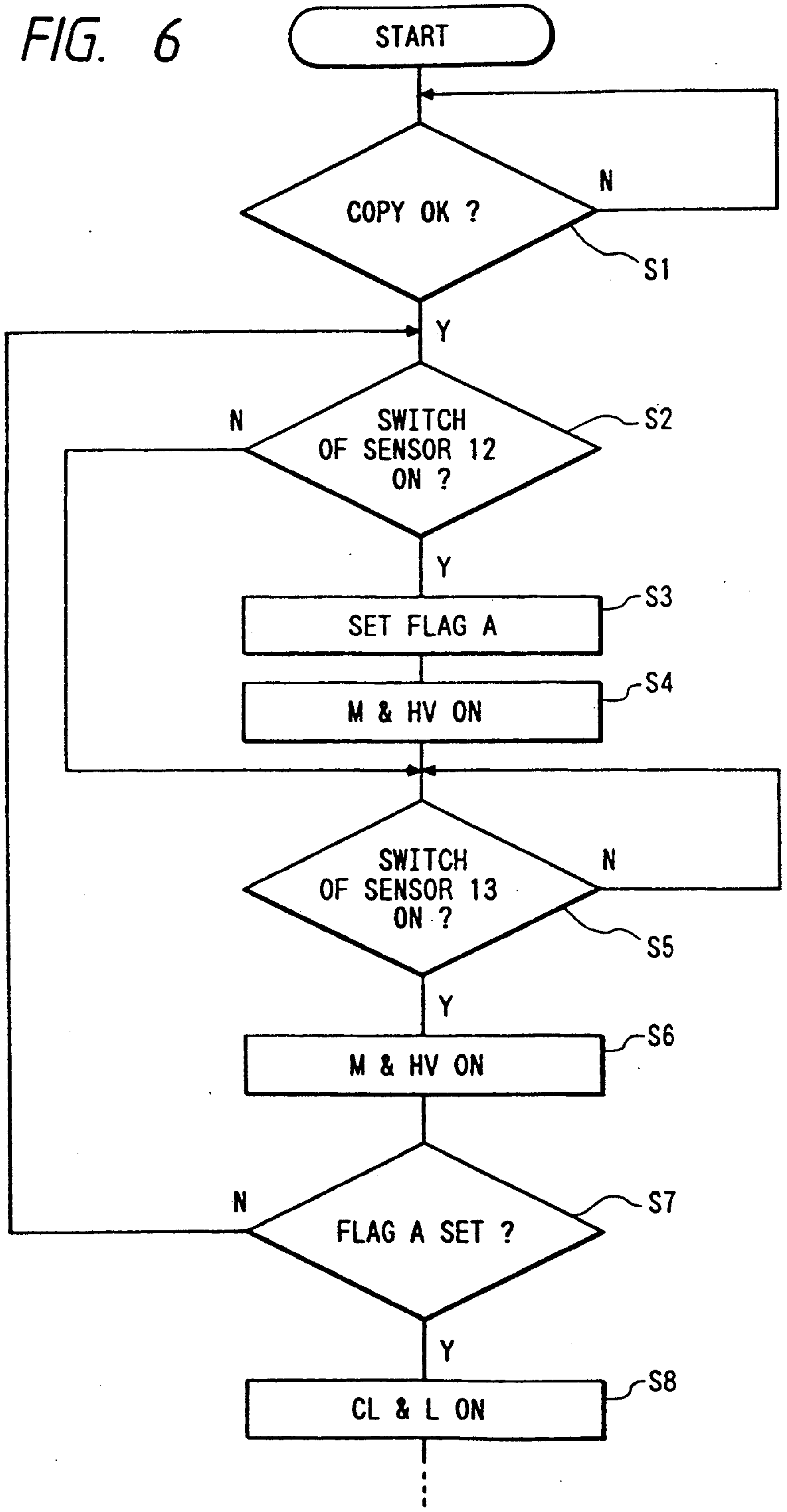
FIG. 6 is a control flowchart for FIG. 5.

In FIG. 6, when a power supply of the computer 50 is first turned on, the program is started and a check is made to see if the fixing device 11 has been made operative so that it can fix the image or not (step S1). If YES, the state of the switch 12 of the sensor to detect the original is discriminated (step S2). If the switch 12 has been set to on, a flag A, that is, data indicative of the detection of the presence of the original is set into the memory RAM in the computer 50 (step S3). Then, the main motor and the high voltage transformer are turned on (step S4), thereby preliminarily cleaning the drum surface and making the potential of the surface uniform.

Next, the state of the switch 13 of the sensor to detect the paper is discriminated (step S5). If the switch 13 has been set to on, a check is made to see if the flag A in the memory has been set or not (step S7). At this time, since the flag A has been set by the switch 12, the lamp 3 (driver 52) is subsequently turned on to start the exposure and, at the same time, the clutch CL to rotate the paper feed roller 7 and original feed roller 1 is driven. In this case, it is also possible to provide a timer to drive the clutch CF after an elapse of a time enough to rotate the drum (step S8).

When the switch 12 does not detect the original yet, a check is made to see if the switch 13 to detect the paper has been turned on or not in step S5. If the paper was detected and the switch 13 is on, the drum is rotated and the high voltage transformer is turned on (step S6) and the processing routine is returned from step S7 to step S2. Thus, the apparatus is held in the standby mode until the switch 12 is turned on.

On the contrary, when the switch 12 detects the original and the switch 13 does not detect the paper yet, the apparatus is held in the standby mode until the switch 13 is turned on (step S5). In each of the waiting times, if the remaining switch is turned on, the copying apparatus promptly starts the copying operation.

Figure 2:
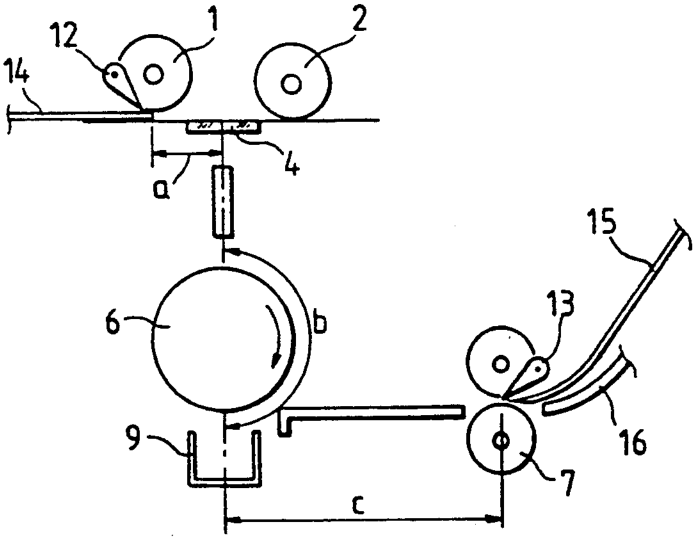
FIG. 2 is a schematic diagram showing the positional relation of the processes in the copying apparatus.

FIG. 2 is a diagram showing the relation of the sensing sections. An original 14 and a copy transfer paper 15 are nipped by nips of the feed roller 1 and paper feed roller 7, respectively. It is preferable to arrange the sensing levers 12 and 13 at positions near the nip portions. It is ideal that the timing when the front edge of the paper is nipped by the nip portion and the timing for detection coincide. However, when the original and copy transfer paper are set, in the case of the ordinary operating speed, even if there is a time deviation corresponding to about a few millimeters between the original and the paper, no practical problem occurs. Further, as shown in FIG. 2, if a paper feed guide 16 is formed like an arc shape, by inserting the copy transfer paper from the upper position, the paper can be certainly led to the nip of the paper feed roller 7 due to the weight of the paper itself.

The operation after the copying operation is started will now be described. As mentioned above, when the original and the copy transfer paper are nipped by the nips of the feed roller 1 and paper feed roller 7 and both of the sensing levers 12 and 13 are turned on, the main motor (not shown) is actuated and a series of copying operations are started.

There are the following three cases between the distance which is obtained by adding a distance a from the feed roller 1 to the exposing portion of the contact glass 4 and a circumferential distance b from the exposing position of the photosensitive drum 6 to the copy transfer position and a distance c from the paper feed roller 7 to the copy transfer position on the photo sensitive drum.

$$\begin{cases} (1)\ a + b > c \\ (2)\ a + b < c \\ (3)\ a + b = c \end{cases}$$

First, in the case of (1), assuming that the original feed roller 1 and paper feed roller 7 are driven simultaneously with the start of the copying operation of the apparatus, the copy transfer paper will have reached the copy transfer position earlier than the toner image, so that the registration will be deviated. To prevent such a problem, a delay mechanism is needed for the paper feed roller 7. For instance, such a registration deviation can be solved by interposing a clutch in the driving system from the main motor to the feed roller 7 and by clutching at a proper timing.

In the case of (2), since the front edge of the toner image on the drum will have contrarily reached the copy transfer position earlier than the copy transfer paper, the registration will be deviated. Therefore, such a problem can be solved by interposing a delay mechanism for the original feed roller.

In any of the above cases, the registration can be matched by only the delay mechanism without the need for a special registration roller or registration shutter.

In the case of (3), there is a positional relation such that the registration is automatically matched by rotating the original feed roller and paper feed roller simultaneously with the start of the copying operation of the apparatus. Thus, the driving system does not need any control mechanism. That is, since it is sufficient to directly transfer the rotation of the main motor to the rollers, the costs can be remarkably reduced.

In FIG. 6, in the case of (1) mentioned above, in step 8, assuming that the clutch of the original feed roller 1 is set to $CL_1$ and the clutch of the paper feed roller 7 is set to $CL_2$, the $CL_2$ is turned on with a time lag in correspondence to the distance of $(a+b)-c$. In the case of (2) mentioned above, in step S8, the $CL_1$ is turned on with a time lag in correspondence to the distance of $c-(a+b)$.

ANOTHER EMBODIMENT

Figure 3:
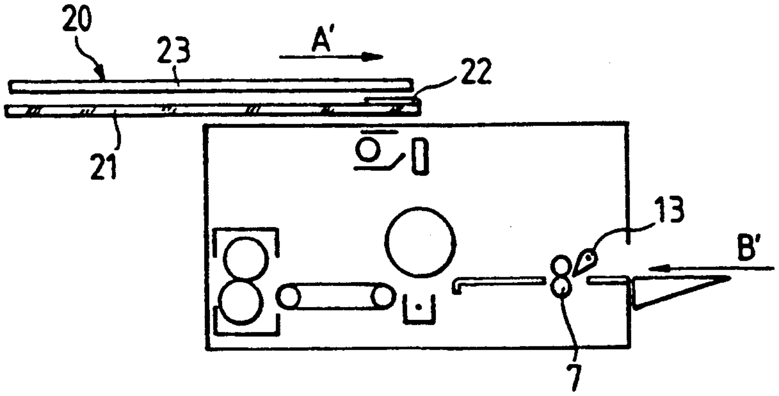
FIG. 3 is a cross sectional view of another embodiment.
Figure 4:
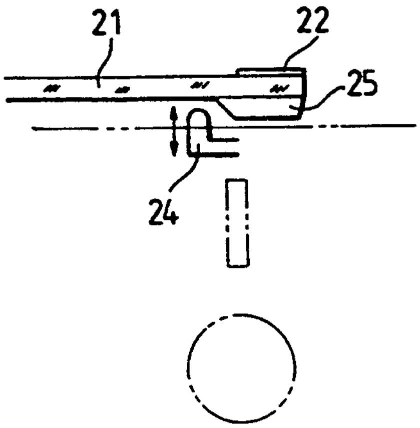
FIG. 4 is a schematic diagram showing sensing means.

FIG. 3 shows another embodiment and illustrates an example of a copying apparatus of the type in which the original placing base plate is moved. In such a type of copying apparatus, generally, an original placing base plate 20 is first located at the central position and is moved backward to the start position (position shown in the diagram) by a start signal and the forward moving scan is started from the start position. In the embodiment, an explanation will be made with respect to a copying apparatus with a construction such that the original placing base plate 20 is manually returned from the central position to the start position. The base plate 20 comprises a platen 21, a size plate 22, a pressure plate 23, and the like and is driven and moved by a rack and pinion or wire driving method. In this case, an original is set onto the platen 21 in a manner such that its front edge abuts on the size plate 22. Therefore, the front edge of the original can be made to correspond with the position of the base plate 20. That is, when the original placing base plate 20 is moved backward by hand, it comes into contact with a stopper (not shown) at a predetermined position. At this time, as shown in FIG. 4, a sensing lever 24 is depressed by a cam 25 provided on the base plate 20, so that a microswitch (not shown)

is turned on. When a copy transfer paper is inserted from the direction of an arrow B', in FIG. 3, the sensing lever 13 is also turned on almost simultaneously at the time when the front edge of the paper is nipped by the nip of the paper feed roller 7, so that the copying operation of the apparatus is started. Since a series of subsequent copying operations are similar to those as mentioned above, their descriptions are omitted.

On the other hand, even in this case, since the copying operation is started by the AND signal of the sensing levers 13 and 24, the original placing base plate 20 can be also returned on the contrary after the copy transfer paper was set. The occurrence of a miscopying operation due to an error of the operating procedure can be prevented.

Further, if the size relations are set in a manner similar to the foregoing case (3), clutches and the like are unnecessary and a copying apparatus which is excellent in cost and space factors can be provided.

We claim:

1. A copying apparatus comprising:

original feeding means for feeding a manually supplied original without interruption to an original exposure position, said original feeding means being provided at a distance a away from the original exposure position;

a photosensitive member on which a latent image is formed by projecting an original image thereon and developed by toner into a toner image;

paper feeding means for feeding a manually supplied paper without interruption to a toner image transfer position where the toner image on said photosensitive member is transferred to the paper, said paper feeding means being provided at a distance a+b away from the toner image transfer position, where b is a circumferential distance from an exposure position of said photosensitive member to the toner image transfer position;

first detecting means for detecting that an original is located at an original feeding means position; and second detecting means for detecting that the paper is located at a paper feeding means position;

wherein said original feeding means and said paper feeding means start original and paper feeding operation, respectively, at the same time, in accordance with detection of the original by the first detecting means when the second detecting means has already detected the paper and with detection of the paper by the second detecting means when the first detecting means has already detected the original.

2. A copying apparatus according to claim 1, wherein said first detecting means detects a leading edge of the original at the original feeding means position, and said second detecting means detects a leading edge of the paper at the paper feeding means position.

3. A copying apparatus according to claim 2, wherein said first detecting means is contiguous with said original feeding means and said second detecting means is contiguous with said paper feeding means.

4. A copying apparatus according to claim 2, wherein upon detection of the original by said first detecting means and detection of an absence of the paper by said second detecting means the copying apparatus is placed in a standby mode whereby a high voltage transformer and a main motor are enabled.

5. A copying apparatus according to claim 2, wherein upon detection of the paper by second detecting means and a detection of an absence of the original by first detecting means, the copying apparatus is placed in a standby mode whereby a high voltage transformer and a main motor are enabled.

6. A copying apparatus comprising:

original feeding means for feeding a manually supplied original without interruption to an original exposure position, said original feeding means provided at a distance a away from the original exposure position;

a photosensitive member onto which a latent image is formed by projecting an original image thereon and developed by toner into a toner image;

paper feeding means for feeding a manually supplied paper without interruption to a toner image transfer position where the toner image on said photosensitive member is to be transferred, said paper feeding means provided at a distance c away from the toner image transfer position;

first detecting means for detecting that the original is located at the original feeding means position; and first detecting means for detecting that the original is located at the original feeding means position; and second detecting means for detecting that the paper is located at the paper feeding means position;

wherein a start time for an original feeding operation by said original feeding means or a start time for a paper feeding operation by said paper feeding means is delayed on the basis of a difference between a distance a+b and the distance c, where b is a circumferential distance from an exposure position of said photosensitive member to the toner image transfer position, and wherein said apparatus starts a copying operation in accordance with detection of the original by the first detecting means when the second detecting means has already detected the paper and with detection of the paper by the second detecting means when the first detecting means has already detected the original.

7. A copying apparatus according to claim 6, wherein said first detecting means detects a leading edge of the original at the original feeding means position, said second detecting means detects a leading edge of the paper at the paper feeding means position.

8. A copying apparatus according to claim 7, wherein said first detecting means is contiguous with said original feeding means and said second detecting means is contiguous with said paper feeding means.

9. A copying apparatus according to claim 7, wherein upon detection of the original by said first detecting means and detection of an absence of the paper by said second detecting means, the copying apparatus is placed in a standby mode whereby a high voltage transformer and a main motor are enabled.

10. A copying apparatus according to claim 7, wherein upon detection of the paper by second detecting means and a detection of an absence of the original by said first detecting means, the copying apparatus is placed in a standby mode whereby a high voltage transformer and a main motor are enabled.

* * * * *

UNITED STATES PATENT AND TRADEMARK OFFICE
CERTIFICATE OF CORRECTION

PATENT NO. : 5,128,727 Page 1 of 2

DATED : July 7, 1992

INVENTOR(S) : Nobukazu Sasaki

It is certified that error appears in the above-identified patent and that said Letters Patent is hereby corrected as shown below:

COLUMN 1:

Line 17, change "hand" to --hand.--.
Line 20, change "provided" to --provided.--.
Line 25, change "tion" to --tion.--.

COLUMN 2:

Line 28, change "photo sensitive" to --photosensitive--. Line 62, change "drivers" to --drivers.--.
Line 64, change "computer" to --controller--.

COLUMN 3:

Line 4, change "computer to --controller--.
Line 67, change "photo sensitive" to --photosensitive--.

UNITED STATES PATENT AND TRADEMARK OFFICE

CERTIFICATE OF CORRECTION

PATENT NO. : 5,128,727

DATED : July 7, 1992

INVENTOR(S) : Nobukazu Sasaki

It is certified that error appears in the above-identified patent and that said Letters Patent is hereby corrected as shown below:

COLUMN 5:

Line 46, change "eration" to --erations,--.

COLUMN 6:

Lines 26-27 should be deleted.

Signed and Sealed this

Fifth Day of October, 1993

Attest:

BRUCE LEHMAN

Attesting Officer

Commissioner of Patents and Trademarks